(12) United States Patent
Alliss

(10) Patent No.: US 6,854,185 B1
(45) Date of Patent: Feb. 15, 2005

(54) VEGETATION TRIMMER APPARATUS

(75) Inventor: George E. Alliss, Lumberton, NC (US)

(73) Assignee: Specialty Coated Products, Inc., Fallsington, PA (US)

( * ) Notice: Subject to any disclaimer, the term of this patent is extended or adjusted under 35 U.S.C. 154(b) by 0 days.

(21) Appl. No.: 10/652,810

(22) Filed: Aug. 29, 2003

(51) Int. Cl.[7] ............................................. A01D 34/416
(52) U.S. Cl. ............................................. 30/276; 30/347
(58) Field of Search ................................... 30/276, 347

(56) References Cited

U.S. PATENT DOCUMENTS

| | | | |
|---|---|---|---|
| 3,708,967 A | 1/1973 | Geist | |
| 3,826,068 A | 7/1974 | Ballas et al. | |
| 4,097,991 A | 7/1978 | Proulx | |
| 4,104,796 A * | 8/1978 | Sheldon et al. | 30/276 |
| 4,104,797 A * | 8/1978 | Ballas | 30/276 |
| 4,172,322 A | 10/1979 | Ballas | |
| 4,271,595 A | 6/1981 | Rahe | |
| 4,366,622 A * | 1/1983 | Lombard | 30/276 |
| 4,571,831 A * | 2/1986 | White, III | 30/276 |
| 4,852,258 A * | 8/1989 | Foster | 30/276 |
| 5,276,968 A * | 1/1994 | Collins et al. | 30/276 |
| 5,671,536 A | 9/1997 | Everts | |
| 5,765,287 A | 6/1998 | Griffin et al. | |
| 6,108,914 A * | 8/2000 | Sheldon | 30/276 |
| 6,148,523 A * | 11/2000 | Everts et al. | 30/276 |
| 6,263,580 B1 | 7/2001 | Stark et al. | |
| 6,279,235 B1 | 8/2001 | White, III et al. | |
| 2004/0134078 A1 | 7/2004 | Pfaltzgraff | |

* cited by examiner

Primary Examiner—Hwei-Siu Payer
(74) Attorney, Agent, or Firm—John F. Letchford (57) ABSTRACT

A vegetation trimmer comprising an elongate main handle to which is connected a motor that rotatably drives a trimmer head located at a distal end of the handle. The trimmer head defines a rotational axis and includes a housing, a spool rotatably received in the housing for carrying at least one coil of flexible trimmer line, a latch member carried by one of the housing and the spool for releasably locking the spool against rotation with respect to the housing, and at least one seat carried by the other of the housing and the spool for receiving the latch member, whereby either the latch member or the at least one seat orbits about the rotational axis of the trimmer head when trimmer line is dispensed from the spool. The spool preferably carries a yieldable trimmer line guide for guiding trimmer line between opposed trimmer line exit ports in the housing.

6 Claims, 8 Drawing Sheets

VEGETATION TRIMMER APPARATUS

FIELD OF THE INVENTION

The present invention relates in general to vegetation trimmer apparatus and in particular to a vegetation trimmer having flexible filament trimmer line that is selectively dispensed from a spool contained within a trimmer head.

BACKGROUND OF THE INVENTION

Internal combustion engine and electric motor powered vegetation trimmers are commonly used to cut and trim grass, weeds, brush and other vegetation. The typical motorized trimmer comprises an elongate handle to which is connected an internal combustion or electric motor that rotatably drives a trimmer head located at a distal end of the handle. The trimmer head, in turn, carries radially outwardly projecting cutting means which cuts the vegetation as the trimmer head rotates.

The trimmer head may include one or more flexible or rigid cutting means. If rigid, the cutting means typically assumes the form of blades fabricated from plastic and/or metal and often have corrugations or scalloping about their peripheral cutting edges. The blades are pivotally attached to the trimmer head such they yield when they contact hard objects, thereby prolonging the service lives of the blades. Rigid blades are normally used to cut very dense vegetation but they may cause considerable injury to the trimmer operator or other persons should they accidentally be struck by the blades during operation of the trimmer.

If flexible, the cutting means may be fabricated as a continuous strand flexible monofilament plastic line wrapped about a spool contained within the trimmer head. In such devices, the plastic line is typically selectively dispensed by the operator of the trimmer apparatus. One species of these sorts of devices is semi-automatic in operation and utilizes the centrifugal force generated by rotation of the trimmer head to dispense trimmer line. Commonly known as "bump indexing" or "bump and feed" trimmers, these apparatus dispense trimmer line responsive to an operator tapping the base of the trimmer head against a hard surface. An example of bump indexing trimmer head is shown in U.S. Pat. No. 6,279,235.

A disadvantage common among bump and feed trimmers is that the trimmer line frequently becomes jammed when a user attempts to dispense fresh line from the spool. When this occurs, the user must stop the trimming operation, disassemble the trimmer head, fix the jam and reassemble the trimmer head before resuming trimming. Such repeated disruption can be quite frustrating and time-consuming.

Another species of vegetation trimmer apparatus where trimmer line is selectively dispensed from a spool by an operator is fully manual in operation. Devices of this sort comprise one or more, typically spring-biased, indexing pins or buttons that are connected to one or more internal trimmer line carrying spools. In order to dispense trimmer line, an operator displaces the indexing pin(s) or button(s) from seating engagement with one or more holes provided in the trimmer head housing. Once the indexing pin(s) or button(s) are separated from the housing, the user either turns the internal spool(s) or pulls on the trimmer line itself from the spool in order to pay out the line from the trimmer head. When the desired length(s) of trimmer line have been dispensed, the operator reseats the indexing pin(s) or button(s) into their associated indexing opening(s) in the trimmer head housing.

The trimmer line dispensing steps required of conventional fully manual trimmer heads are often cumbersome to perform with two hands. The trimmers are also complicated in design which needlessly increases their manufacturing costs. Examples of various designs of fully manual trimmer line trimmer heads are disclosed in U.S. Pat. Nos. 4,271,595; 4,172,322; 4,097,991; 3,826,068 and 3,708,967.

In addition to trimmer line dispensing problems, presently available semi-automatic and fully manual trimmer heads are often difficult to reload with fresh trimmer line when their spools have been depleted. Once the new trimmer line has been wrapped around the spool, the installer must grasp the trimmer head housing while holding the line in the wrapped position about the spool and then insert the spool into the housing. This procedure is especially cumbersome with respect to bump indexing trimmers because the installer must also hold and/or maintain alignment of any springs or other loose components of the bump and feed indexing system during the spool installation process.

Attempts to overcome these problems have been proposed in the prior art. For example, U.S. Pat. Nos. 5,671,536 and 6,263,580 disclose spool reloading solutions for bump and feed trimmers wherein trimmer line can be wound onto the internal spool without removing the spool from the trimmer head housing, although the system taught by U.S. Pat. No. 5,671,536 requires additional user participation to anchor the trimmer line to the spool prior to winding/loading it on the spool. However, the results are trimmer line spools of highly complex configuration whose manufacturing costs are unnecessarily expensive.

U.S. Pat. No. 5,765,287 also describes a trimmer head that enables winding of a desired quantity of trimmer line on a spool without removing the spool from the trimmer housing. In one embodiment, the device incorporates a rigid trimmer line guide tube that spans most of the diameter of the spool. Trimmer line is threaded into one trimmer line exit port in the trimmer head housing and passed through the guide tube. Upon exiting the guide tube the trimmer line is passed through the opposite trimmer head housing exit port. When the desired length of trimmer line is threaded through the trimmer head, the installer rotates a knob integrally connected to the spool and the trimmer line is wound onto the core of the spool.

The trimmer head disclosed in U.S. Pat. No. 5,765,287 suffers certain disadvantages, however. That is, the rigid trimmer line guide tube presents an obstruction in the spool chamber that hinders uniform and compact winding of the trimmer line onto the spool. Additionally, the trimmer line can also be damaged or severed as it comes into contact slotted edges at the opposite ends of the guide tube during winding.

An advantage exists, therefore, for a vegetation trimmer apparatus including a rotatable trimmer head that incorporates trimmer line indexing means and coil winding means of simple, economical and reliable design, construction and operation.

Other details, objects and advantages of the present invention will become apparent as the following description of the presently preferred embodiments and presently preferred methods of practicing the invention proceeds.

SUMMARY OF THE INVENTION

The present invention provides a motorized vegetation trimmer apparatus comprising an elongate main handle to which is connected an internal combustion or electric motor that rotatably drives a trimmer head located at a distal end of the handle. The trimmer apparatus preferably includes a steering handle attached to the main handle to facilitate guidance of the apparatus during operation.

The trimmer head defines a rotational axis and comprises a housing and a spool contained within the housing. The spool carries one or more radially outwardly projecting cutting means which cut the vegetation as the trimmer head rotates. The cutting means comprises at least one continuous length of pliant strand or string that is wound about the spool. The pliant strand is preferably flexible monofilament plastic of a type used in conventional vegetation trimmer apparatus, e.g., nylon or the like. According to a preferred embodiment, fresh cutting means is preferably dispensed by unseating latch means carried by the spool from seat means carried by the trimmer head housing, winding the spool until a desired quantity of cutting means has been dispensed and reseating the latch means with the seat means. The spool also preferably carries a yieldable trimmer line guide for guiding trimmer line between opposed trimmer line exit ports in the housing. So constructed, the trimmer head is uncomplicated in design, reliable in operation, and inexpensive and simple to manufacture.

BRIEF DESCRIPTION OF THE DRAWINGS

The invention will become more readily apparent from the following description of preferred embodiments thereof shown, by way of example only, in the accompanying drawings wherein.

DETAILED DESCRIPTION OF THE INVENTION

Figure 1:
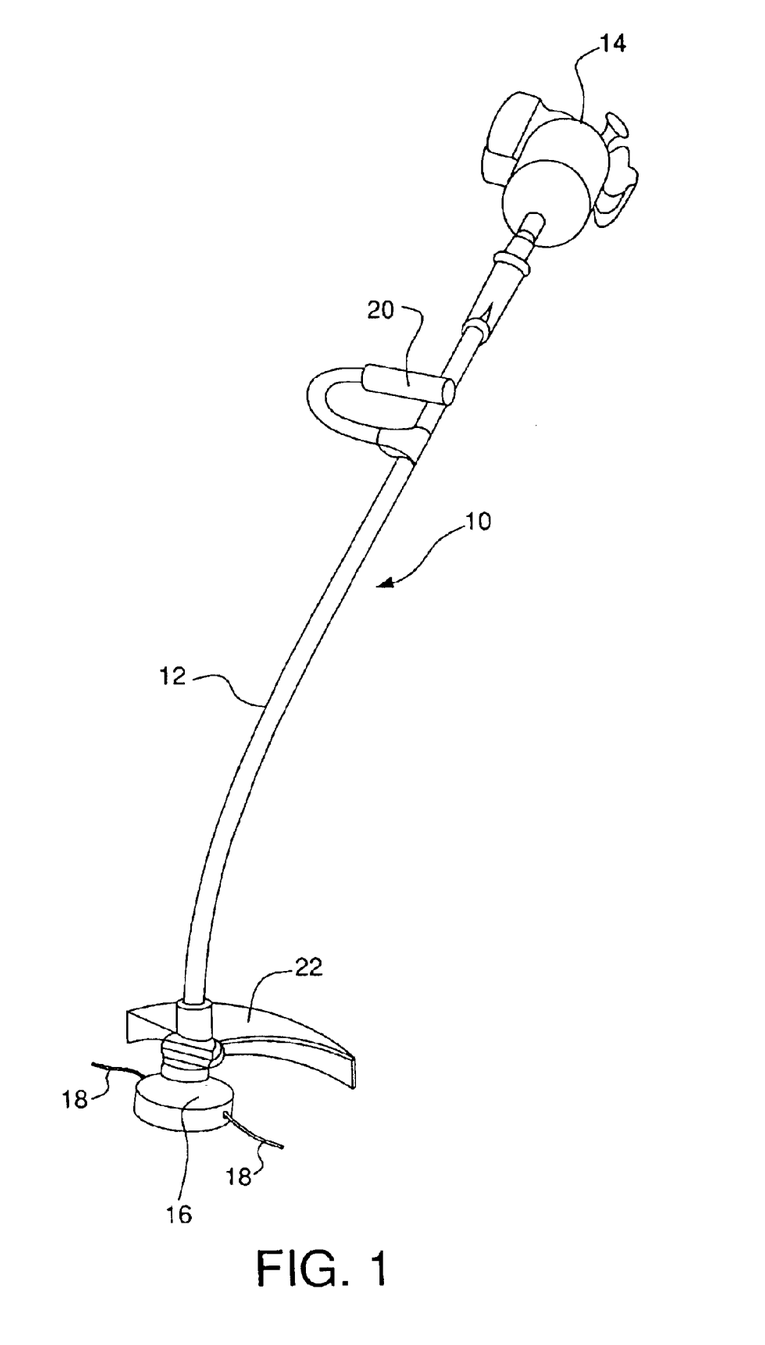
FIG. 1 is a perspective view of a motorized vegetation trimmer apparatus including a rotatable trimmer head and a plurality of flexible cutting means according to the present invention.

Referring to the drawings, wherein like references indicate like or similar elements throughout the several views, there is shown in FIG. 1 a motorized vegetation trimmer apparatus 10 according to the present invention. Apparatus 10 comprises an elongate main handle 12 which to which is connected an internal combustion or electric motor 14 which rotatably drives a trimmer head 16 located at a distal end of the handle. Trimmer head 16 carries one or more radially outwardly projecting cutting means 18 which cut the vegetation as the trimmer head rotates. Preferably, trimmer apparatus 10 includes a steering handle 20 attached to the main handle 12 to facilitate guidance of the apparatus during operation. A shield 22 is also desirably provided for the operator's safety.

Figure 2:
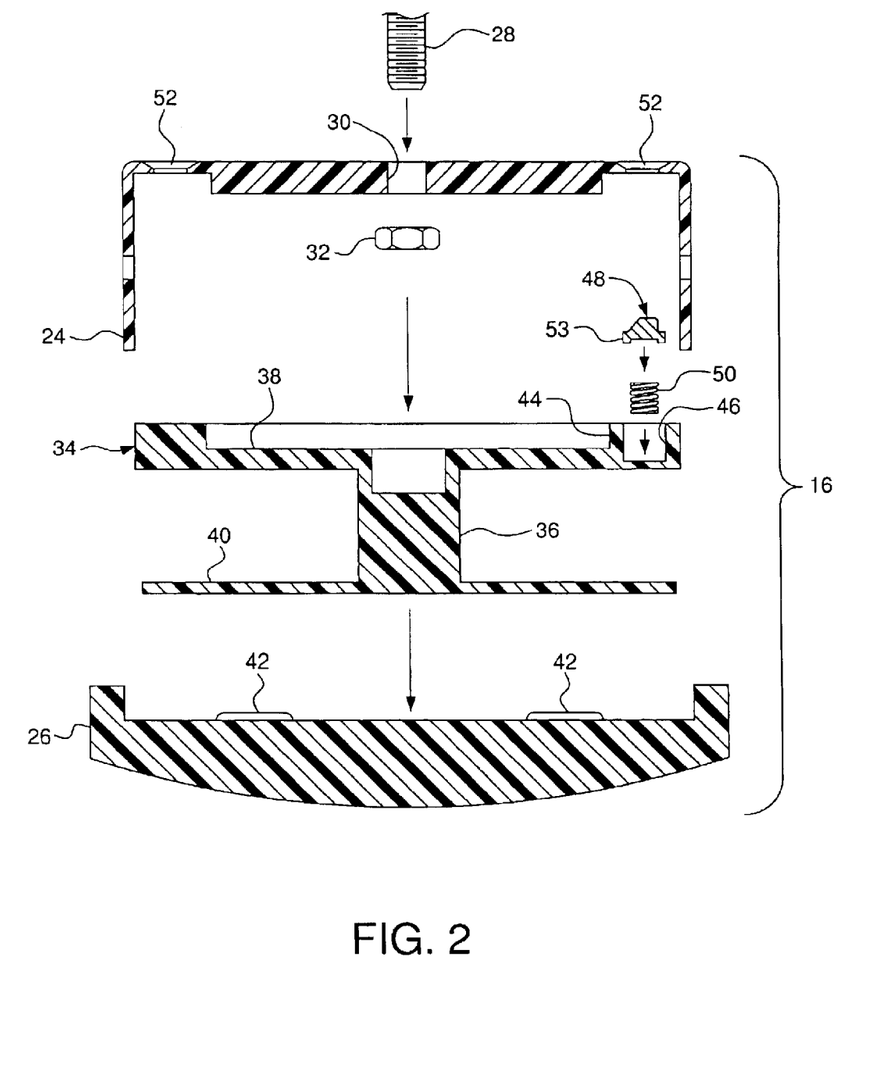
FIG. 2 is an exploded view of a first embodiment of a trimmer head constructed according to the present invention.

Referring to FIG. 2 there is shown an exploded view of a first presently preferred embodiment of a trimmer head 16 according to the invention that is used for cutting vegetation in conjunction with an internal combustion engine or electric motor powered trimmer apparatus such as apparatus 10 shown in FIG. 1. Trimmer head 16 preferably comprises a rigid molded plastic first or "top" body member 24 and a rigid molded plastic second or "bottom" body member 26. Body members 24,26 may be releasably fastened to one another by a snap, threaded, J-slot or other suitable releasable connection. Together, body members 24,26 are referred to herein as the trimmer head housing. A threaded arbor of a trimmer apparatus drive shaft is identified by reference numeral 28. In order to secure body member 24 to threaded arbor 28, the threaded arbor is inserted through a central opening 30 in the top of body member 24 and a nut fastener 32 is threaded onto the arbor in the manner known in the art. As used herein, spatial terms such as "top", "bottom", "upper", "lower", etc. refer to the relative positions that the various structural components described herein would assume when trimmer head 16 is "in use," i.e., when attached to the rotating drive shaft of a conventional internal combustion or electric powered trimmer apparatus.

Figure 3:
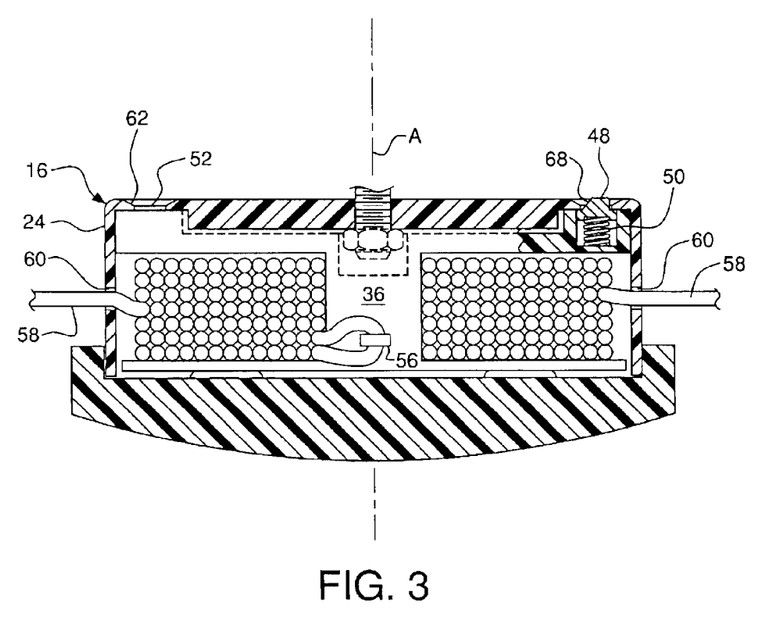
FIG. 3 is an assembled, partial cross-section view of the trimmer head of FIG. 2.

Rotatably contained within the trimmer head housing is a rigid trimmer line spool 34 for carrying a coil of trimmer line in the manner shown in FIG. 3. Spool 34 comprises a cylindrical core 36 bounded on its upper and lower ends by circular disc-like flanges 38 and 40. It will be understood that spool 34 may comprise a single chamber (as shown) for carrying one coil of trimmer line or it may be divided into two or more compartments by the provision of one or more intermediate flanges between flanges 38,40 in the manner known in the art. Additionally, in order to reduce friction between the spool 34 and the trimmer head housing, the opposed interior faces of either or both of the top and body members 24,26 may be provided with thrust bearing means such as, for example, continuous or discontinuous raised formations 42. Alternatively, the thrust bearing means may be provided on either or both of the upper surface of upper spool flange 38 and the lower surface of lower spool flange 40.

Upper spool flange 38 may include an region of enlarged thickness 44 defining an upwardly open chamber 46. Alternatively, the upper flange may have a uniform thickness which is sufficient to accommodate chamber 46. The chamber receives a manually actuatable button 48 and a compressible and resilient biasing means 50 such as a mass of elastomer or, as illustrated, a compression spring, for biasing button 48 upwardly toward top body member 24. The top body member includes one or more openings 52, and button 48 includes a lower flange 53 of larger size than the opening(s) 52 to prevent dislodgement of the button from the trimmer head housing. As will be more fully appreciated by reference to FIGS. 3 and 4, openings 52, together with button 48 and biasing means 50, comprise indexing means for enabling a user to selectively dispense or pay out desired lengths of trimmer line from the trimmer head 16. In addition, the central region of the spool core 36 may be provided, if necessary, with an upwardly open socket 54 to provide clearance for the distal end of arbor 28.

Turning to FIG. 3, it will be seen that spool 34 preferably includes anchorage means 56 for holding trimmer line 58 in place as a user winds a coil of line around the core 36. Anchorage means 56 may be disposed on the core, as illustrated, or on either or both of the upper and lower flanges 38, 40. The anchorage means may comprise one or more grippers for holding the end(s) of one or more lengths of trimmer line. Alternatively, the anchorage means may be in the form of an eyelet or the like, as shown, for holding a loop of trimmer line. So constructed, a single length of line may be formed into two strands that may be simultaneously wrapped about the spool core and whose ends pass through trimmer line exit ports 60 provided in the trimmer head housing.

Figure 4:
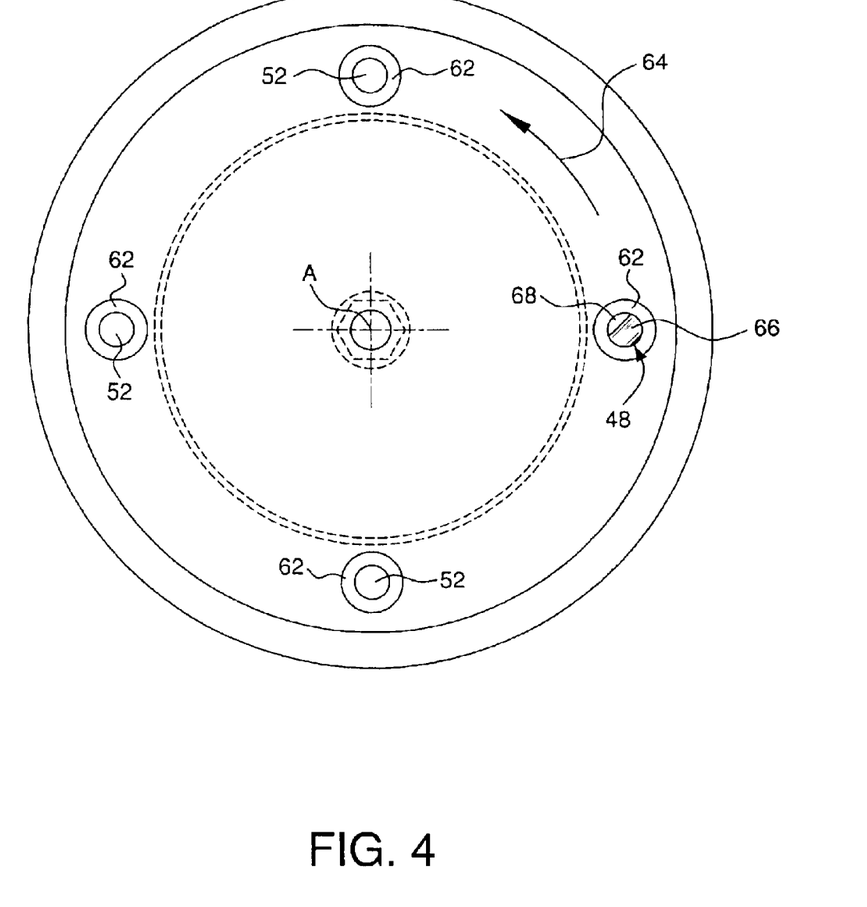
FIG. 4 is a top plan view of the assembled trimmer head of FIG. 3.

As shown in FIGS. 3 and 4, the trimmer head housing defines a rotational axis "A" which is coaxial with the axis of rotation of the trimmer apparatus drive shaft and the axis of rotation of the spool 34 with respect to the trimmer head housing. Those figures also depict the structure and mode of operation of a first embodiment of latch and seat type indexing means according to the present invention for dispensing or paying out selected increments of trimmer line. As mentioned above, top body member 24 includes at least one opening 52 for releasably receiving the upper portion of a manually actuatable button 48. For smaller trimmer heads, i.e., up to about 0.4 inches in diameter, the apparatus may include one or two openings 52. For larger trimmer heads, the apparatus may include three or more openings 52. And, to facilitate guidance of a user's finger toward the button 48, the upper portion of the opening(s) 52 are preferably beveled as shown at 62.

During operation of the trimmer apparatus, trimmer line 58 becomes worn or damaged and new line must periodically be dispensed from trimmer head 16. To do this, a user depresses button 48 against the biasing force of biasing means 50 until the top of the button is below the interior face of the top body member 24. The user then pulls an exposed end of trimmer line 58 thereby causing the spool 34 to rotate about axis A as indicated by arrow 64 in FIG. 4. It will be understood that the counter-clockwise direction of arrow 64 is merely illustrative but not limitative. That is, the direction that spool 34 rotates when paying out trimmer line depends on the direction that the trimmer line is coiled about the spool core 36. Arrow 64 is merely indicative of how the button 48 orbits about axis A as it is indexed from one opening 52 to the next. When button 48 reaches the next opening 52 in its orbit, biasing means 50 forces the top of the button into latched and seated engagement with that opening, thereby locking the spool against rotation with respect to the trimmer head housing.

As most clearly seen in FIG. 4, at least a portion of the top surface of button 48 is preferably provided with ribs or other surface irregularities 66 for resisting slippage of a user's finger from the top of the button when depressing the button. Moreover, it is also desirable that a portion 68 of the sidewall of button 48 be sloped. The purpose of the sloped portion of the button sidewall is to facilitate passage of the button under and past the perimeter of the opening 52 in which the button was previously seated when it comes time to pay out fresh trimmer line. Similarly, it is also preferred that the undersurface of the top body member 24 at each opening 52 be provided with a bevel having a slope corresponding to that of the sloping button sidewall 68 for even easier passage of the button beneath the top body member. As noted above, spool 34 may rotate clockwise or counter-clockwise with respect to the trimmer head housing depending on the winding direction of the trimmer line coil. To exploit this functionality to its fullest advantage, it is preferable that the button 48 be freely rotatable in relation to the biasing means 50 (or that the biasing means be freely rotatable within chamber 46 if the button and biasing means are affixed to one another) whereby a user can selectively point the sloping sidewall 68 of the button in the desired direction of spool rotation for trimmer line dispensing.

Figure 5:
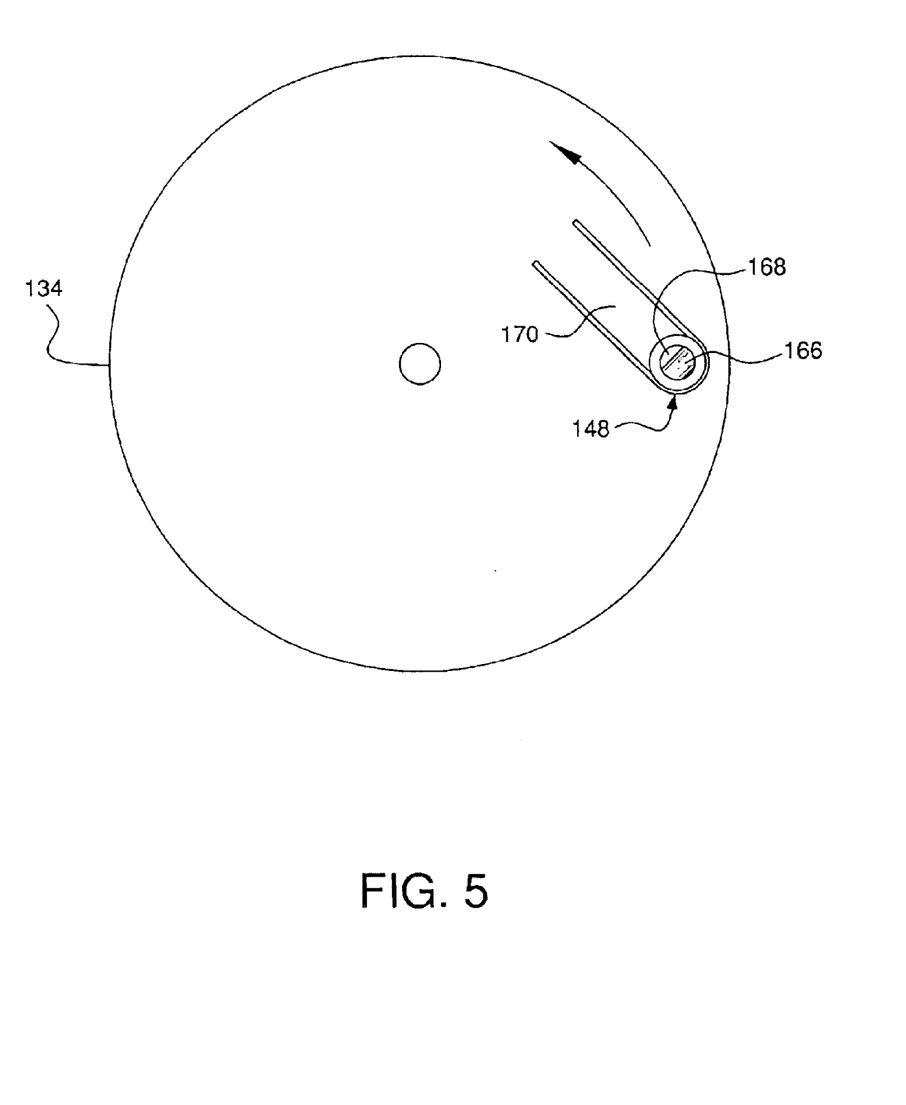
FIG. 5 is a top plan view of a further embodiment of a trimmer line spool of a trimmer head constructed according to the present invention.
Figure 6:
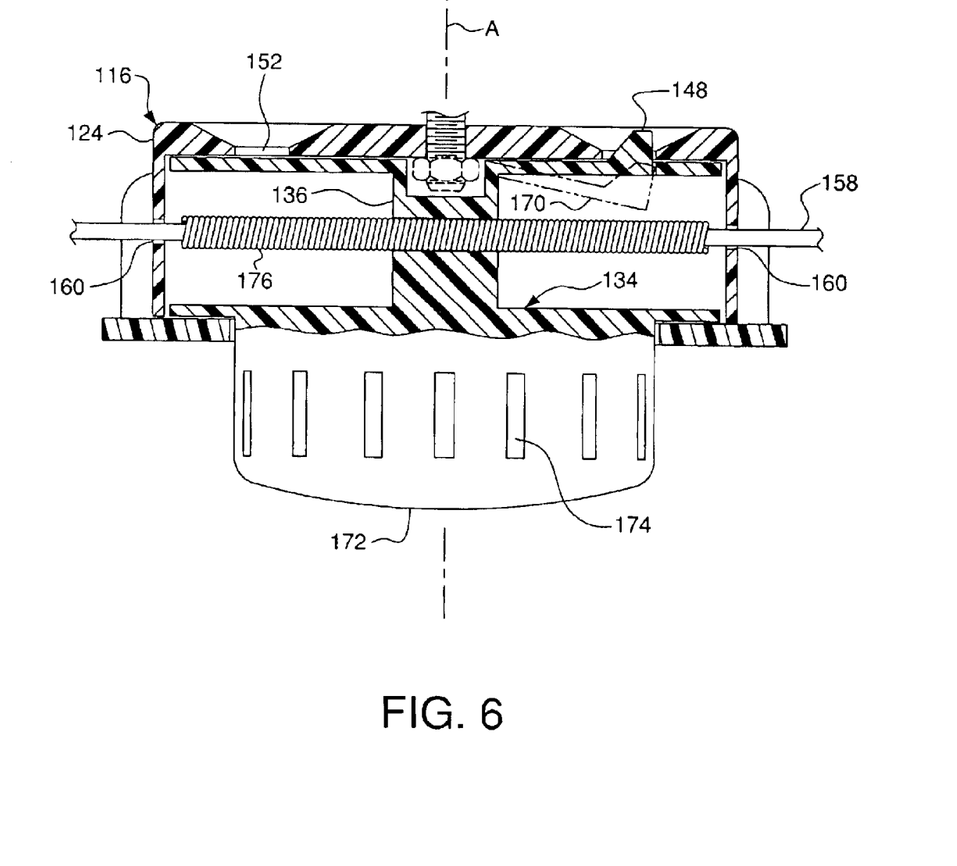
FIG. 6 is an assembled, partial cross-section view of a further embodiment of a trimmer head constructed according to the present invention that incorporates the trimmer line spool of FIG. 5.
Figure 7:
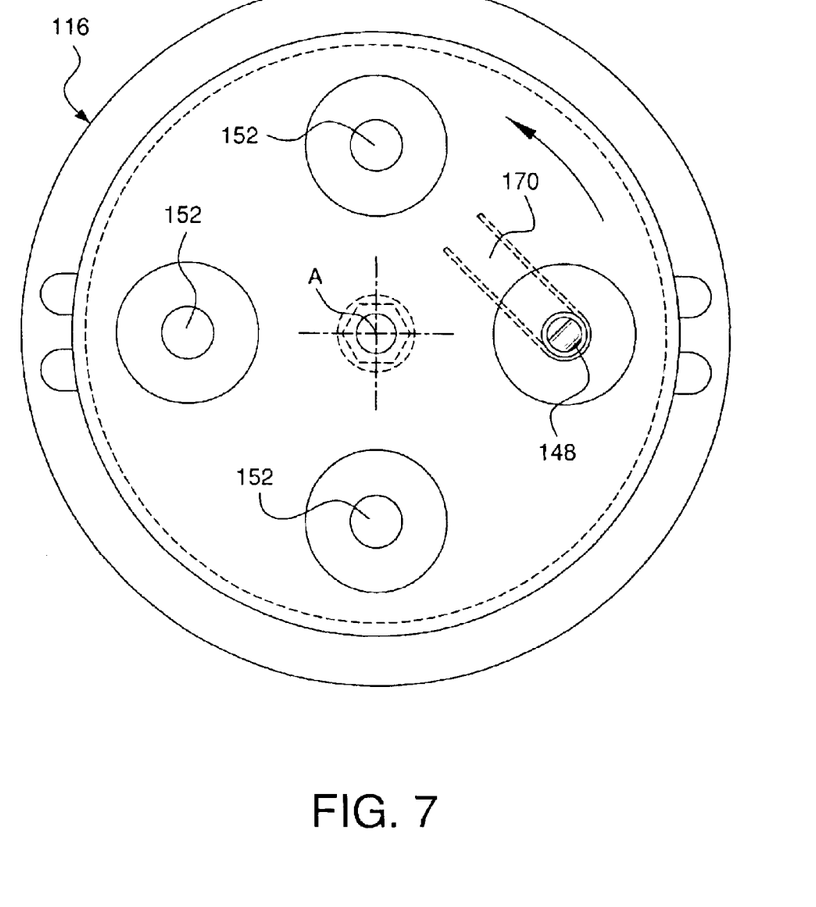
FIG. 7 is a top plan view of the assembled trimmer head of FIG. 6.

FIGS. 6 and 7 reveal an alternative embodiment of a vegetation trimmer head 116 and FIG. 5 depicts an alternative embodiment of a trimmer line spool 134 constructed in accordance with the present invention. In many respects, trimmer head 116 is very similar to trimmer head 16 described above. Accordingly, only those features that depart materially in structure and/or function from their counterparts in FIGS. 2–4 or are otherwise necessary for a proper understanding of the invention will be described in detail in connection with FIGS. 5–7.

Referring to FIG. 5, there is shown a top view of a trimmer line spool 134 adapted for use in the trimmer head 116 shown in FIGS. 6 and 7. According to this embodiment, the biasing means of the latch means comprises a resilient tab 170 attached to or, preferably, formed integrally with the spool 134. The proximal end of tab 170 is connected to the spool and the distal end thereof carries a raised latch button 148 which is preferably similar in many respects to button 48 described above. That is, button 148 preferably includes finger slip resistant means 166 and sloped wall 168 similar in structure and function to their counterpart elements 66 and 68.

A trimmer head housing must be formed of high strength and rugged plastic in order to withstand the impact forces typically encountered when trimming grass, brush and other vegetation. Such plastics are very rigid. If the tab 170 and its button 148 are formed integrally with spool 134, then the entire spool must be fabricated from plastic material having less rigidity than the housing. More specifically, the material selected for the spool must be such that tab 170 flexes downwardly upon depression of button 148 (shown in dashed line in FIG. 7) yet reliably and instantaneously returns to its unflexed position when it encounters an opening 152 provided in the top body member 124 (FIGS. 6 and 7) whereby it latches into seated engagement in the opening and locks the spool against rotation. Thus, when dispensing trimmer line, the indexing means of FIGS. 5–7, including resilient tab 170 and openings 152, function essentially the same as their counterparts in FIGS. 2–4.

Although the latch and seat trimmer line indexing means shown in FIGS. 2–7 represent the presently preferred embodiments thereof, it is contemplated that other designs could be employed. For instance, the latch member could be carried by the trimmer head housing and the latch seat opening(s) could be provided in the trimmer line spool. And, the latch mechanism could be located on the bottom of the trimmer head rather than on the top. Regardless of their actual construction, however, the trimmer line indexing means of the present invention comprise cooperating latch and seat structure carried by the trimmer head housing and the trimmer line spool whereby one element of the mechanism, either latch or seat, orbits about the central axis A of the trimmer head when trimmer line is paid out from the trimmer head.

Figure 8:
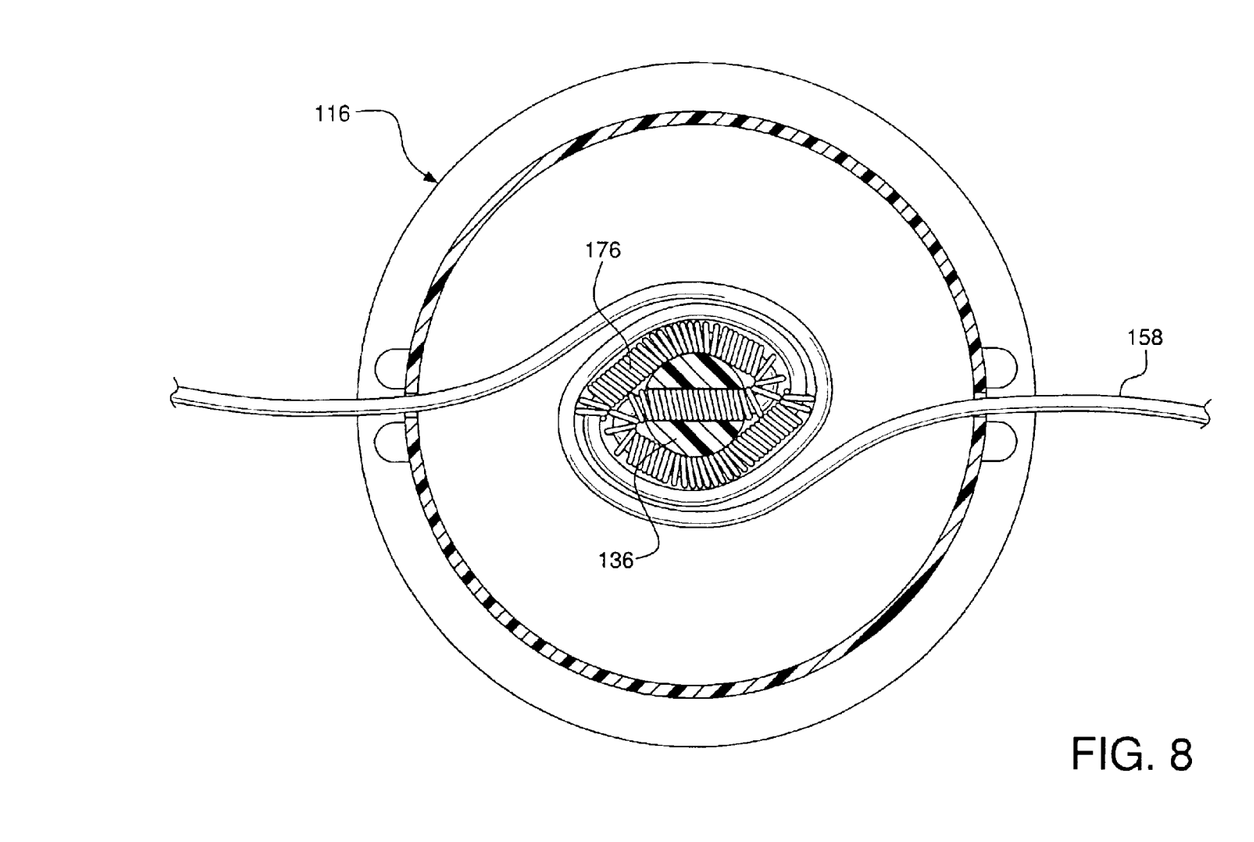
FIG. 8 is a top plan view of the trimmer head of FIGS. 6 and 7 with certain elements omitted for clarity and depicting manner by which trimmer line is coiled about the spool.

FIGS. 6 and 8 also show another preferred feature of the present invention, namely, a system for rapidly loading a coil of trimmer line onto the core of a trimmer line spool, e.g., line 158 onto core 136 of spool 134, without removing the spool from the trimmer head housing. The rapid loading system is useful not only in fully manual trimmer heads such as those thus far described, but also semi-automatic bump indexing varieties as well.

In particular, spool 134 includes an integral knob or the like 172 that projects through an aperture provided in the bottom body member 126. Knob 172 is preferably provided with a plurality of raised formations 174 about its periphery to enhance a user's grip as he or she rotates the knob. The turning torque created by the spool core is required in order to wind trimmer line onto the spool. That is, a length of line must be inserted in a first trimmer line exit port 160, then passed through the spool core 136 and out of the opposing exit port 160 before the line can be wound onto the spool. Trimmer line 158 (or 58) may be any commercially available flexible monofilament plastic trimmer line of any suitable type and cross-sectional configuration, e.g., 0.065, 0.080, 0.095, 0.105, 0.12, 0.13 or 0.15 gauge nylon trimmer line or the like, which is currently used in conventional vegetation trimmer apparatus. Such line is inherently flexible; indeed, the smaller gauge lines are quite supple. Limp lines would be difficult to thread across trimmer head housings which may range up to 5 inches or more in diameter. Because of this, a need exists for a way to assure that the trimmer line is supported throughout its passage through the trimmer head.

Accordingly, the trimmer head shown in FIG. 6 also desirably includes trimmer line guide means 176 which preferably passes through the spool core 136 and substantially spans the inner diameter of the trimmer head housing. Trimmer line guide means 176 is a flexible yet resilient tubular member that has sufficient elastic memory to return to the straight configuration shown in FIG. 6 when it is necessary to coil new trimmer line onto the spool 134. A tubular member having both high flexibility and high resilience is ideal for this purpose because it must be straight when the trimmer line is being threaded through the trimmer head, as shown in FIG. 6, and it should yield to substantially conform to the shape of the spool core 136 when the coil is being wrapped around the core, as shown in FIG. 8. A presently preferred example of trimmer line guide means 176 according to the invention is a coil spring.

The yieldable trimmer line guide means 176 offers several important advantages over the rigid trimmer line guide tube described in U.S. Pat. No. 5,765,287. It urges the initial windings of the trimmer line coil around the spool core in gentle arcs rather than sharp turns as winding is commenced. And, because it conforms to the spool core during winding, it does not present an obstruction in the spool chamber that would hinder uniform and compact winding of the trimmer line onto the spool. Further, it presents no sharp edges that could damage or sever the trimmer line during winding.

Although the invention has been described in detail for the purpose of illustration, it is to be understood that such detail is solely for that purpose and that variations can be made therein by those skilled in the art without departing from the spirit and scope of the invention as defined by the claims.

What is claimed is:

1. A vegetation trimmer head adapted to be rotatably driven by a drive shaft of a motorized vegetation trimmer apparatus, said vegetation trimmer head comprising:
   a housing having a pair of opposed trimmer line exit ports and means for enabling releasable attachment of said housing to a drive shaft of a motorized vegetation trimmer apparatus;
   a spool rotatably received in said housing for carrying at least one coil of flexible trimmer line; and
   yieldable trimmer line guide means comprising a spring carried by said spool for guiding trimmer line between said exit ports.

2. A vegetation trimmer head adapted to be rotatably driven by a drive shaft of a motorized vegetation trimmer apparatus, said vegetation trimmer head comprising:
   a housing having a pair of opposed trimmer line exit ports and means for enabling releasable attachment of said housing to a drive shaft of a motorized vegetation trimmer apparatus;
   a spool rotatably received in said housing for carrying at least one coil of flexible trimmer line; and
   yieldable trimmer line guide means passing through a core of said spool for guiding trimmer line between said exit ports.

3. A vegetation trimmer head adapted to be rotatably driven by a drive shaft of a motorized vegetation trimmer apparatus, said vegetation trimmer head comprising:
   a housing having a pair of opposed trimmer line exit ports and means for enabling releasable attachment of said housing to a drive shaft of a motorized vegetation trimmer apparatus;
   a spool rotatably received in said housing for carrying at least one coil of flexible trimmer line;
   yieldable trimmer line guide means carried by said spool for guiding trimmer line between said exit ports; and
   knob means connected to said spool for turning said spool with respect to said housing.

4. A vegetation trimmer apparatus comprising:
   an elongate handle;
   a motor connected to said handle; and
   a rotatable trimmer head connected to said handle and rotatably driven by said motor, said trimmer head comprising:
     a housing having a pair of opposed trimmer line exit ports;
     a spool rotatably received in said housing for carrying at least one coil of flexible trimmer line; and
     yieldable trimmer line guide means comprising a spring carried by said spool for guiding trimmer line between said exit ports.

5. A vegetation trimmer apparatus comprising:
   an elongate handle;
   a motor connected to said handle; and
   a rotatable trimmer head connected to said handle and rotatably driven by said motor, said trimmer head comprising:
     a housing having a pair of opposed trimmer line exit ports;
     a spool rotatably received in said housing for carrying at least one coil of flexible trimmer line; and
     yieldable trimmer line guide means passing through a core of said spool for guiding trimmer line between said exit ports.

6. A vegetation trimmer apparatus comprising:
   an elongate handle;
   a motor connected to said handle; and
   a rotatable trimmer head connected to said handle and rotatably driven by said motor, said trimmer head comprising:
     a housing having a pair of opposed trimmer line exit ports;
     a spool rotatably received in said housing for carrying at least one coil of flexible trimmer line;
     yieldable trimmer line guide means carried by said spool for guiding trimmer line between said exit ports; and
     knob means connected to said spool for turning said spool with respect to said housing.

* * * * *